United States Patent
Vankamamidi et al.

(10) Patent No.: US 11,592,988 B2
(45) Date of Patent: Feb. 28, 2023

(54) UTILIZING A HYBRID TIER WHICH MIXES SOLID STATE DEVICE STORAGE AND HARD DISK DRIVE STORAGE

(71) Applicant: EMC IP Holding Company LLC, Hopkinton, MA (US)

(72) Inventors: Vamsi K. Vankamamidi, Hopkinton, MA (US); Shuyu Lee, Acton, MA (US); Amitai Alkalay, Kadima (IL); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 17/146,783

(22) Filed: Jan. 12, 2021

(65) Prior Publication Data

US 2022/0221988 A1    Jul. 14, 2022

(51) Int. Cl.
*G06F 3/06* (2006.01)

(52) U.S. Cl.
CPC .......... *G06F 3/0611* (2013.01); *G06F 3/0631* (2013.01); *G06F 3/0653* (2013.01); *G06F 3/0659* (2013.01); *G06F 3/0685* (2013.01)

(58) Field of Classification Search
CPC .. G06F 11/1076; G06F 3/0689; G06F 3/0688; G06F 3/061; G06F 3/0659; G06F 3/0631; G06F 12/0246; G06F 2211/1057; G06F 3/0683; G06F 3/0679; G06F 3/0685; G06F 3/0611; G06F 3/0653
USPC ................. 711/114, 103, 100, 170, E12.001, 711/E12.103, 154, E12.008
See application file for complete search history.

(56) References Cited

U.S. PATENT DOCUMENTS

| | | | |
|---|---|---|---|
| 8,315,995 | B1 | 11/2012 | Levy |
| 8,370,597 | B1 | 2/2013 | Chatterjee et al. |
| 8,433,848 | B1 | 4/2013 | Naamad et al. |
| 8,578,096 | B2 | 11/2013 | Malige et al. |
| 8,880,801 | B1 | 11/2014 | Robins et al. |
| 9,043,530 | B1 * | 5/2015 | Sundaram ............. G06F 3/0656 711/158 |
| 11,188,236 | B2 | 11/2021 | Cherubini et al. |
| 11,327,668 | B1 | 5/2022 | Hua et al. |
| 2012/0246403 | A1 * | 9/2012 | McHale ............. G06F 12/0866 711/E12.019 |
| 2014/0019680 | A1 * | 1/2014 | Jin ..................... G11B 20/1217 711/112 |
| 2015/0278020 | A1 * | 10/2015 | Watanabe ........... G06F 11/1092 714/6.21 |
| 2017/0052713 | A1 * | 2/2017 | Katiyar ................ G06F 3/0611 |
| 2017/0337107 | A1 * | 11/2017 | Zhang .................. G06F 3/0685 |
| 2020/0117386 | A1 * | 4/2020 | Dong .................... G06F 3/0608 |

* cited by examiner

*Primary Examiner* — Tuan V Thai
*Assistant Examiner* — Edward Waddy, Jr.
(74) *Attorney, Agent, or Firm* — BainwoodHuang (57) ABSTRACT

A technique manages data within a storage array. The technique involves forming a hybrid tier within the storage array, the hybrid tier including SSD storage and HDD storage. The technique further involves, after the hybrid tier is formed, providing hybrid ubers (or Redundant Array of Independent Disks (RAID) extents) from the SSD storage and the HDD storage of the hybrid tier. The technique further involves, after the hybrid ubers are provided, accessing the hybrid ubers to perform data storage operations.

21 Claims, 6 Drawing Sheets

UTILIZING A HYBRID TIER WHICH MIXES SOLID STATE DEVICE STORAGE AND HARD DISK DRIVE STORAGE

BACKGROUND

Conventional data storage systems store data using Redundant Array of Independent Disks (RAID) protection schemes that enable continued access to the data in the event of storage drive failures. An example RAID protection scheme is RAID1 in which mirroring copies of data reside on different storage drives so that, if one storage drive fails, there is a remaining mirroring copy of the data still available on another storage drive. Another example RAID protection scheme is RAID5(4+1) in which each storage stripe consists of four data segments and one parity segment and in which each segment resides on a different storage drive so that information on a failed storage drive can be reconstructed from the remaining storage drives.

Such a conventional data storage system may include homogeneous storage tiers. Along these lines, the conventional data storage system may have a homogeneous high speed tier consisting exclusively of flash memory drives, and a homogeneous moderate speed tier consisting exclusively of magnetic disk drives.

SUMMARY

There may be deficiencies with the above-described conventional data storage system. Along these lines, suppose that the conventional data storage system has a healthy number of magnetic disk drives but only a limited number of flash memory drives available for use. In particular, suppose that the conventional data storage system is provisioned with exactly three flash memory devices.

Unfortunately, if the conventional data storage system uses RAID1 (mirroring) in the homogeneous high speed tier consisting exclusively of flash memory drives, there is very high overhead for RAID protection. That is, the flash memory cost required to protect data is 100% since a mirroring copy of that data must be stored in flash memory as well.

Additionally, if the conventional data storage system uses RAID5(2+1) in a homogeneous high speed tier consisting exclusively of flash memory drives, there is still high overhead for RAID protection. Here, the flash memory cost required to protect data is 50% since there is a flash memory parity segment for every two flash memory data segments.

In contrast to the above-described conventional data storage system having a homogeneous high speed tier consisting exclusively of flash memory drives, improved techniques utilize a hybrid tier which mixes solid state device (SSD) storage and hard disk drive (HDD) storage. For example, in the context of a storage array in which the number of SSD storage devices is limited, data may be stored only on SSD storage and parity may be stored only on HDD storage. Accordingly, SSD storage no longer bears the cost for RAID protection but nevertheless provides certain speed advantages such as very fast read speeds (e.g., data may be read simply from SSD storage). Additionally, in the context of log-structured storage, use of such a hybrid tier still provides good write speeds (e.g., where the performance impact of writing parity to HDD storage of the hybrid tier is approximately 3% when flushing data from cache).

One embodiment is directed to a method of managing data within a storage array. The method includes forming a hybrid (or heterogeneous) tier within the storage array, the hybrid tier including SSD storage and HDD storage. The method further includes, after the hybrid tier is formed, providing hybrid ubers (or RAID extents) from the SSD storage and the HDD storage of the hybrid tier. The method further includes, after the hybrid ubers are provided, accessing the hybrid ubers to perform data storage operations.

Another embodiment is directed to data storage equipment which includes memory and control circuitry coupled to the memory. The memory stores instructions which, when carried out by the control circuitry, causes the control circuitry to perform a method of:
 (A) forming a hybrid tier within a storage array, the hybrid tier including solid state device (SSD) storage and hard disk drive (HDD) storage,
 (B) after the hybrid tier is formed, providing hybrid ubers from the SSD storage and the HDD storage of the hybrid tier, and
 (C) after the hybrid ubers are provided, accessing the hybrid ubers to perform data storage operations.

Yet another embodiment is directed to a computer program product having a non-transitory computer readable medium which stores a set of instructions to manage data within a storage array. The set of instructions, when carried out by computerized circuitry, causes the computerized circuitry to perform a method of:
 (A) forming a hybrid tier within the storage array, the hybrid tier including solid state device (SSD) storage and hard disk drive (HDD) storage;
 (B) after the hybrid tier is formed, providing hybrid ubers from the SSD storage and the HDD storage of the hybrid tier; and
 (C) after the hybrid ubers are provided, accessing the hybrid ubers to perform data storage operations.

In some arrangements, forming the hybrid tier includes identifying SSD storage positions from a set of SSDs and identifying HDD storage positions from a set of HDDs to provide the SSD storage and the HDD storage in accordance with a mapped-RAID architecture.

In some arrangements, providing the hybrid ubers includes, to form a hybrid uber, mapping at least one SSD storage position identified from the set of SSDs and at least one HDD storage position identified from the set of HDDs and, after the hybrid uber is formed, incorporating the hybrid uber into log-structured storage, e.g., a hybrid circular storage log.

In some arrangements, mapping to form the hybrid uber includes configuring each of the at least one SSD storage position to store only data, and configuring each of the at least one HDD storage position to store only parity.

In some arrangements, mapping to form the hybrid uber includes combining multiple SSD storage positions and one HDD storage position into a RAID5 layout.

In some arrangements, mapping to form the hybrid uber includes combining exactly two SSD storage positions and exactly one HDD storage position into a RAID5(2+1) layout in which data is stored in each SSD storage position and parity is stored in the exactly one HDD storage position.

In some arrangements, the method further includes:
 (A) forming a HDD tier within the storage array, the HDD tier including additional HDD storage provided by additional HDD storage positions identified from the set of HDDs;
 (B) after the HDD tier is formed, providing HDD ubers from the additional HDD storage of the HDD tier; and
 (C) after the HDD ubers are provided, accessing the HDD ubers to perform data storage operations.

In some arrangements, mapping to form the hybrid uber includes combining multiple SSD storage positions and one HDD storage position into a RAID5 layout. Additionally, providing the HDD ubers from the additional HDD storage of the HDD tier includes forming a HDD uber from at least some of the additional HDD storage positions, the HDD uber having a RAID6 layout.

In some arrangements, the method further includes providing a garbage collection service that garbage consolidates valid data from the hybrid tier to the HDD tier to reclaim storage capacity in the log-structured storage.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in utilizing a hybrid tier which mixes SSD storage and HDD storage.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique utilizes a hybrid (or heterogeneous) storage tier which mixes solid state device (SSD) storage and hard disk drive (HDD) storage. For example, in the context of a storage array in which the number of SSD storage devices is limited, data may be stored only on SSD storage and parity may be stored only on HDD storage. Accordingly, SSD storage no longer bears the cost for RAID protection but nevertheless provides certain speed advantages such as very fast read speeds (e.g., data may be read simply from SSD storage). Additionally, in the context of log-structured storage, use of such a hybrid storage tier still provides good write speeds (e.g., where the performance impact of writing parity to HDD storage of the hybrid storage tier is approximately 3% when flushing data from cache).

Figure 1:
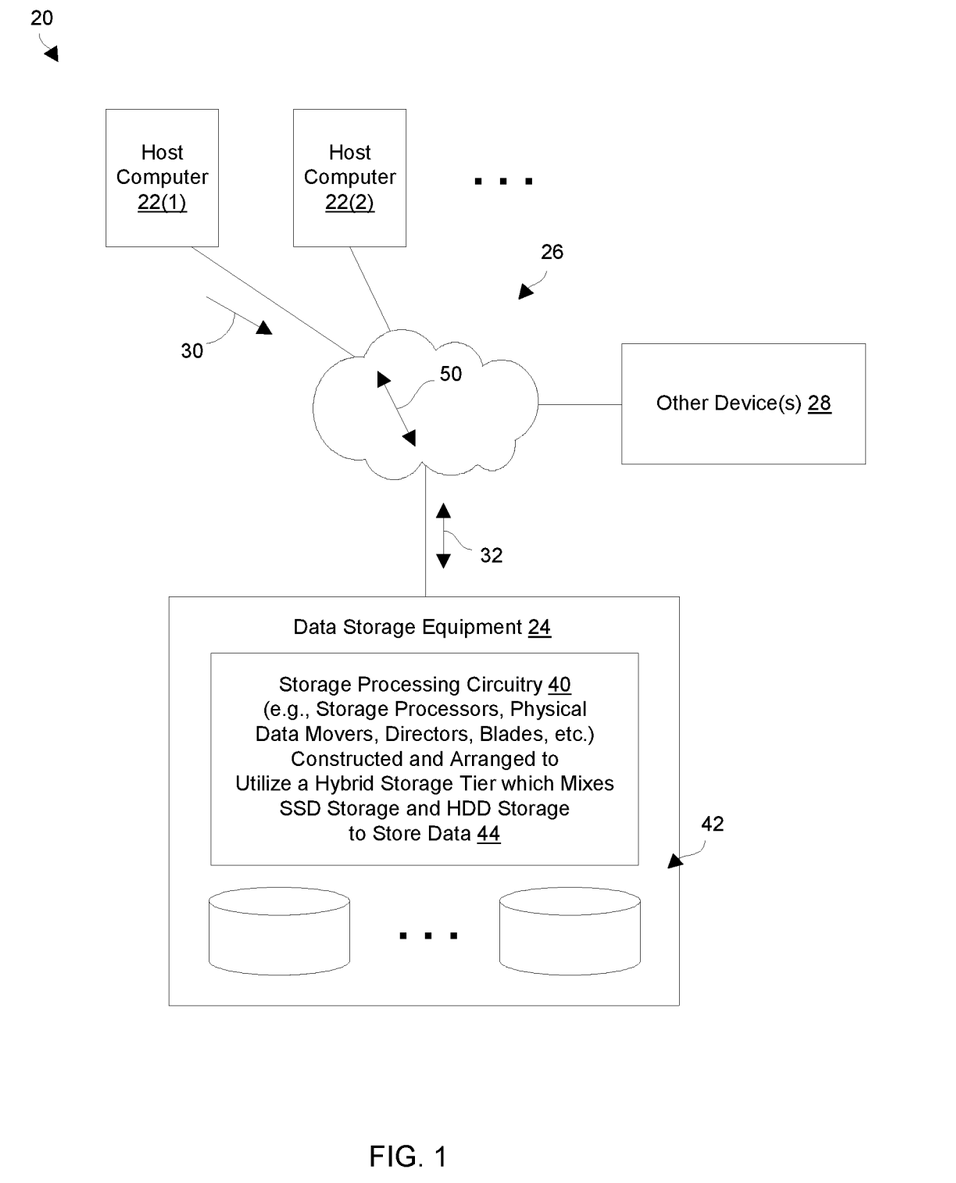
FIG. 1 is a block diagram of a data storage environment that utilizes a hybrid tier which mixes solid state device (SSD) storage and hard disk drive (HDD) storage in accordance with certain embodiments.

FIG. 1 shows a data storage environment 20 which utilizes a hybrid storage tier (or simply hybrid tier) that mixes solid state device (SSD) storage and hard disk drive (HDD) storage in accordance with certain embodiments. The data storage environment 20 includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage or non-volatile memory, snapshot/backup/archive storage, combinations thereof, etc.).

The data storage equipment 24 includes storage processing circuitry 40 and storage devices 42. The storage processing circuitry 40 is constructed and arranged to respond to the host I/O requests 30 from the host computers 22 by writing data 44 into the storage devices 42 and reading the data 44 from the storage devices 42. The storage processing circuitry 40 may include one or more storage processors or engines, data movers, director boards, blades, I/O modules, storage device controllers, switches, other hardware, combinations thereof, and so on. As will be explained in further detail shortly, the storage devices 42 provide access to both solid state device (SSD) storage and hard disk drive (HDD) storage in accordance with a mapped-RAID architecture.

While processing the host I/O requests 30, the storage processing circuitry 40 stores the data 44 in log-structured storage within the hybrid tier. Additionally, the storage processing circuitry 40 may provide a variety of specialized data storage services and features such as caching, garbage collection, deduplication, compression, encryption, snapshotting, backup/archival services, replication to other data storage equipment, and so on. As will be explained in further detail shortly, the storage processing circuitry 40 is capable of utilizing hybrid (or homogeneous) ubers in accordance with a particular RAID protection scheme, e.g., where each hybrid uber includes multiple SSD storage positions for storing data and one HDD storage position for storing parity.

It should be understood that the data 44 may include the host data 32 from the host computers 22. The data 44 may include other data as well such as data created from user-level applications running on the data storage equipment 24, data generated from processing the host data 32 locally on the data storage equipment 24, snapshots of the host data 32, and so on. The data 44 may further include other types of data such as parity, mapping data, block and/or file system metadata, deduplication data, compression data, versioning data, data to support recovery, configuration data, and other types of metadata, combinations thereof, and so on, which is managed and maintained by the data storage equipment 24.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include remote data storage equipment that provides user data 44 to and/or receives user data 44 from the data storage equipment 24 (e.g., replication arrays, backup and/or archiving equipment, service processors and/or management devices, etc.).

During operation, the storage processing circuitry 40 of the data storage equipment 24 performs data storage operations to richly and robustly store the data 44 within the storage devices 42. Along these lines, the storage processing circuitry 40 writes new data and updates existing data by writing the data 44 to log-structured storage formed from SSD storage and HDD storage. The log-structured storage includes hybrid ubers (or RAID extents) in accordance with one or more RAID protection schemes.

Additionally, to ensure there is available storage space within the log-structured storage, the storage processing circuitry 40 performs garbage collection in the background to consolidate the data 44 and reclaim storage space. Along these lines, such garbage collection reads valid data 44 from inefficiently utilized memory spaces and writes the valid data 44 to new memory spaces within the log-structured storage (or to another storage tier, e.g., a slower HDD tier). In accordance with certain embodiments, the storage processing circuitry 40 performs writes using physical large block (PLB) granularity.

Furthermore, in accordance with certain embodiments, the data storage equipment 40 may include one or more other storage tiers. For example, the data storage equipment 40 may include a homogeneous HDD tier. In such a situation, the hybrid tier is the faster tier and the homogeneous HDD tier is the slower tier.

During operation, data 44 is flushed from a cache. Such flushing may involve selecting dirty pages from a non-volatile random access memory (NVRAM) device, classifying the pages for possible deduplication, performing other operations (e.g., deduplication, compression, etc.), writing to the hybrid tier (or alternatively to the homogeneous HDD tier), and updating various mappings.

It should be appreciated that the above-described flush cycle usually takes 100 ms or more while writing to HDD storage may take around 5 ms. Accordingly, the flush performance impact of writing to the hybrid tier is generally 3 to 4%.

Also, during operation, garbage collection is performed on the hybrid tier. In accordance with certain embodiments, garbage collected data is moved from the hybrid tier to the homogeneous HDD tier.

In accordance with other embodiments, if the data 44 has been recently accessed, the data 44 may be rewritten to the log-structure storing and thus remain in the hybrid tier. However, if the data 44 has not been accessed for a while (i.e., the data 44 is deemed to have become cold), the data 44 may be evicted to the homogeneous HDD tier.

In some embodiments, the hybrid tier stores data 44 in accordance with a RAID5 protection scheme. In a particular embodiment, the hybrid tier includes hybrid ubers where each hybrid uber includes two SSD storage positions and one HDD storage position in accordance with RAID5(2+1).

In some embodiments, the homogeneous HDD tier stores data 44 in accordance with RAID6. Accordingly, there is extra RAID protection provided for HDD storage. Further details will now be provided with reference to FIG. 2.

Figure 2:
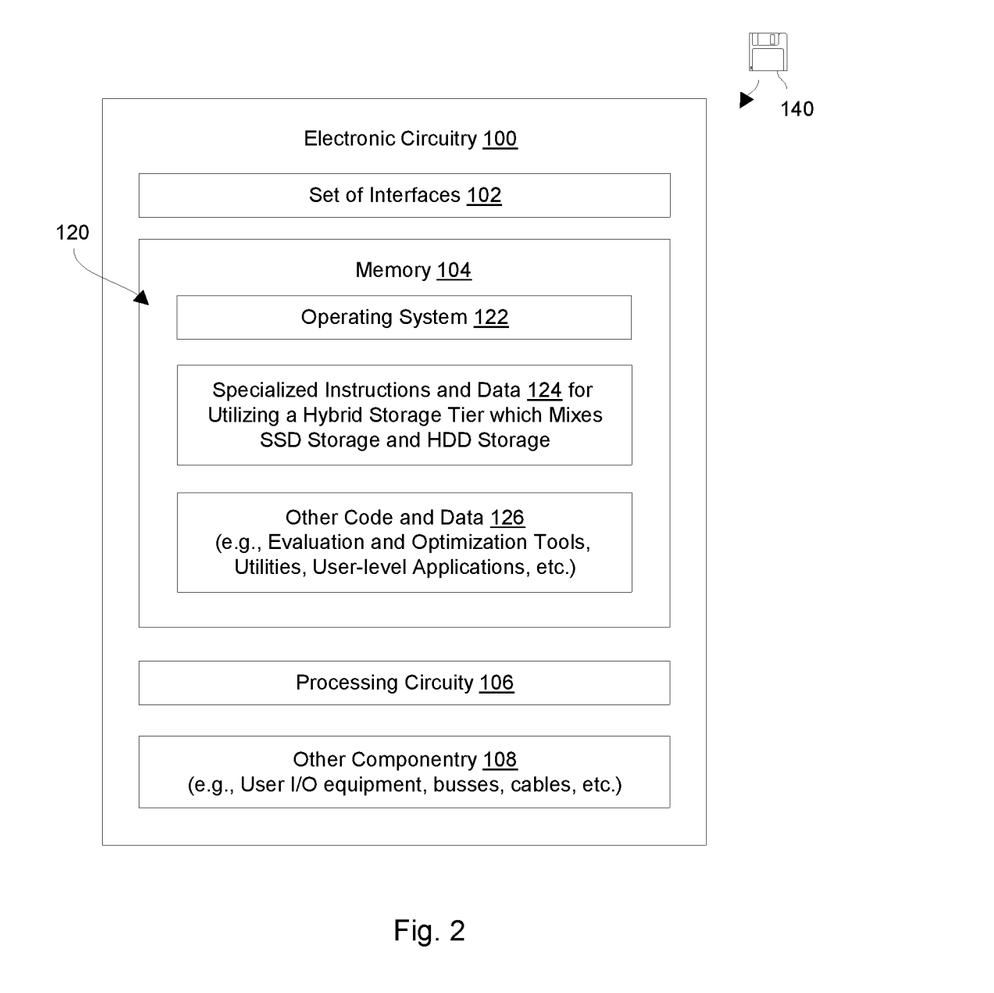
FIG. 2 is a block diagram of data storage equipment of the data storage environment in accordance with certain embodiments.

FIG. 2 shows electronic circuitry 100 which is suitable for the storage processing circuitry 40 of the data storage equipment 24 (also see FIG. 1). The electronic circuitry 100 includes a set of interfaces 102, memory 104, and processing circuitry 106, and other circuitry 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular instructions for utilizing a hybrid storage tier which mixes SSD storage and HDD storage. In some arrangements, the specialized instructions and data 124 is tightly integrated with or part of the operating system 122 itself. The other code and data 126 refers to applications and routines to provide additional operations and services (e.g., performance measurement tools, etc.), user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of a set of hosts. Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 140 is capable of delivering all or portions of the software constructs 120 to the storage processing circuitry 106. In particular, the computer program product 140 has a non-transitory (or non-volatile)

computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), busses, cabling, adaptors, auxiliary apparatuses, other specialized data storage componentry, etc.

It should be understood that the processing circuitry 106 operating in accordance with the software constructs 120 enables utilization of a hybrid storage tier. Such utilization provides fast performance (e.g., fast reads) and high SSD storage efficiency (e.g., parity may be stored on HDD storage rather than SSD storage). Further details will now be provided with reference to FIG. 3.

Figure 3:
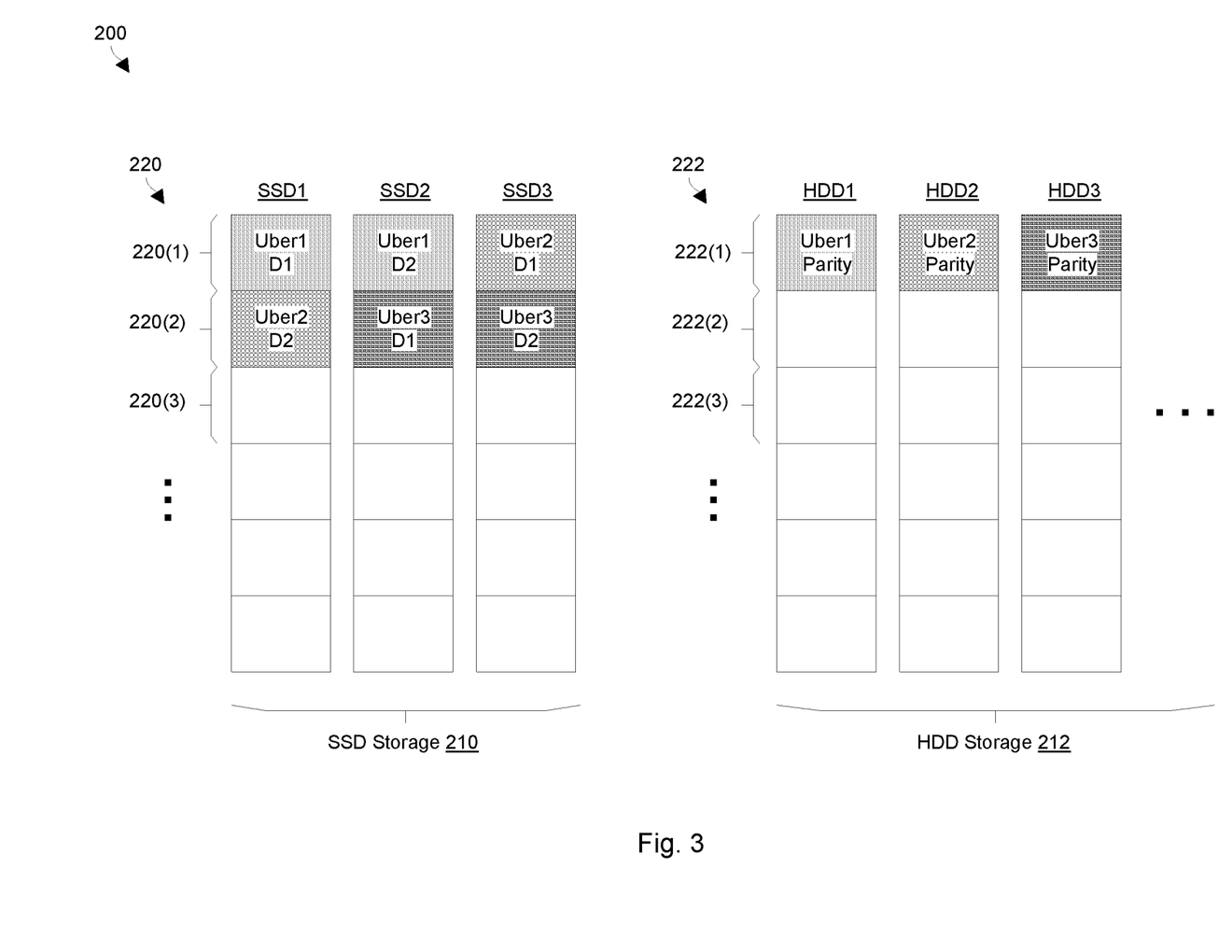
FIG. 3 is a block diagram illustrating particular details of a hybrid tier example in accordance with certain embodiments.

FIG. 3 shows a storage array example in accordance with certain embodiments. In this storage array example, a storage array 200 includes SSD storage 210 and HDD storage 212 (also see the data storage equipment 24 in FIG. 1). The SSD storage 210 is provided by three solid state devices SSD1, SSD2, SSD3 (collectively, SSDs). The HDD storage 212 is provided by multiple hard disk drives HDD1, HDD2, HDD3, . . . (collectively, HDDs).

Each SSD includes a series of SSD storage positions 220(1), 220(2), 220(3), . . . (collectively, SSD positions 220) which are adjacent contiguous regions of SSD memory. Similarly, each HDD includes a series of HDD storage positions 222(1), 222(2), 222(3), . . . (collectively, HDD positions 222) which are adjacent contiguous regions of HDD memory.

Such storage positions 220, 222, which also may be referred to as segments or disk slices, serve as allocation units that the storage array 200 uses to form RAID constructs in a mapped-RAID system. In particular, the storage array 200 utilizes the SSD positions 220 and the HDD positions 222 to form one or more storage tiers. Along these lines, the storage array 200 combines SSD positions 220 and HDD positions 222 to form a hybrid tier having log-structured storage in accordance with RAID5. The storage array 200 may form other storage tiers as well such as a homogeneous HDD tier.

For the hybrid tier, the storage array 200 combines SSD positions 220 and HDD positions 222 to form hybrid ubers. Each hybrid uber includes at least one SSD position 220 and at least one HDD position 222. In accordance with certain embodiments, each hybrid uber uses a RAID5(2+1) protection scheme where each hybrid uber has two SSD positions 220 for storing data and one HDD position 222 for storing parity. If there is a lost position 220, 222 (e.g., due to a storage device failure), the information on the lost position 220, 222 may be reconstructed from the information on the remaining positions 220, 222.

As shown in FIG. 3, the storage array 200 forms a first uber, i.e., Uber1, using position 220(1) of SSD1, position 220(1) of SSD2, and position 222(1) of HDD1. In particular, the position 220(1) of SSD1 stores data D1 of Uber1. Additionally, the position 220(1) of SSD2 stores data D2 of Uber1. Furthermore, the position 222(1) of HDD1 stores parity of Uber1.

Similarly, the storage array 200 forms a second uber, i.e., Uber2, using position 220(1) of SSD3, position 220(2) of SSD1, and position 222(1) of HDD2. In particular, the position 220(1) of SSD3 stores data D1 of Uber2. Additionally, the position 220(2) of SSD1 stores data D2 of Uber2. Furthermore, the position 222(1) of HDD2 stores parity of Uber2.

Likewise, the storage array 200 forms a third uber, i.e., Uber3, using position 220(2) of SSD2, position 220(2) of SSD3, and position 222(1) of HDD3. In particular, the position 220(2) of SSD2 stores data D1 of Uber3. Additionally, the position 220(2) of SSD3 stores data D2 of Uber3. Furthermore, the position 222(1) of HDD3 stores parity of Uber3.

If the storage array 200 is unable to obtain the information from a particular uber position, the storage array 200 is able to recover the lost information from the remaining two uber positions. For example, if the storage array 200 is unable to obtain the data D1 of Uber2 (e.g., see the position 220(1) of SSD3), the storage array 200 is able to recover the lost information from the data D2 of Uber2 and the parity of Uber2 (e.g., see the position 220(2) of SSD1 and the position 222(1) of HDD2).

In the above-described hybrid tier, only data is stored in the SSD storage 210 and all parity is stored in the HDD storage 212. That is, 100% of the SSD storage 210 may be used for data storage for maximum data storage efficiency. Moreover, operations to read data may be performed at SSD access speeds. Additionally, writing operations which involve flushing data from cache memory to secondary storage only impact performance by around 3%+/−. In some arrangements, the storage array 200 performs writes using physical large block (PLB) granularity (i.e., PLBs within the hybrid ubers).

It should be understood that the storage array 200 may include one or more storage tiers in addition to the hybrid tier. For example, the storage array 200 may further include a homogeneous HDD tier that uses HDD positions 222. In such a situation, the storage array 200 allocates HDD positions 222 to form homogeneous HDD ubers in accordance with a particular RAID protection scheme. For example, each HDD uber may use RAID6 (i.e., RAID protection using two parity positions) thus enabling successful data reconstruction following failure of two HDD positions 222. Further details will now be provided with reference to FIG. 4.

Figure 4:
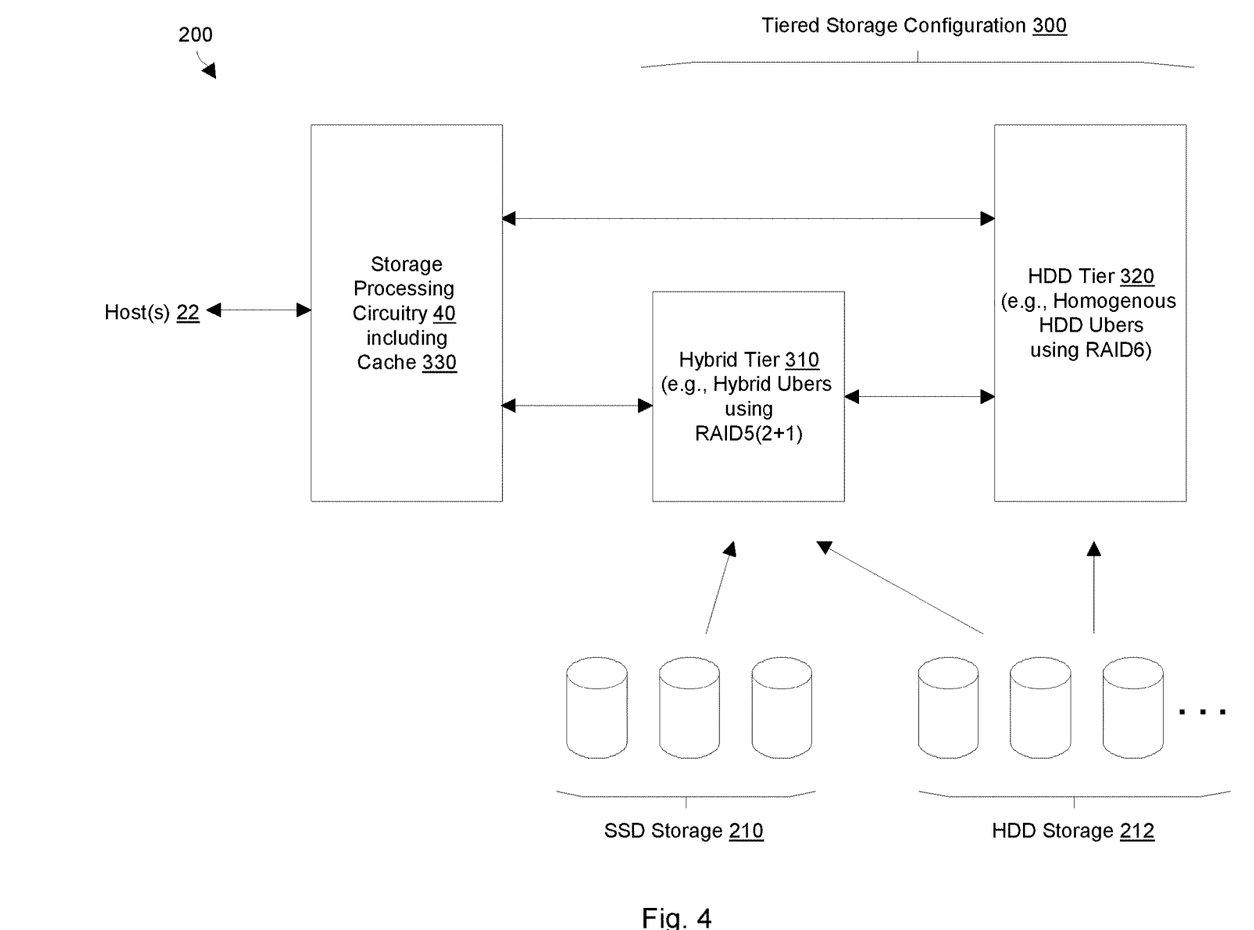
FIG. 4 is a block diagram illustrating additional details of an example storage array in accordance with certain embodiments.

FIG. 4 shows a tiered storage configuration 300 for the storage array 200 in accordance with certain embodiments. As shown, the tiered storage configuration 300 includes a hybrid tier 310 and a HDD tier 320.

It should be understood that the tiered storage configuration 300 is provided by way of example only. Other tiered storage configurations are suitable for use as well and may include other storage tiers such as a homogeneous SSD tier, a HDD tier having faster speed magnetic disk drives, another HDD tier having slower speed magnetic disk drives, and so on.

As mentioned earlier in connection with FIG. 3, the hybrid tier 310 includes log-structured storage that uses hybrid ubers having SSD positions that store data and HDD positions that store parity such as in accordance with RAID5 (2+1). Such use of a hybrid tier 310 is well suited for a storage array 200 having limited SSD storage 210 (e.g., just three SSD storage devices) since 100% of SSD storage 210 may be used for storing data.

In contrast to the hybrid tier 310 that uses hybrid ubers, the HDD tier 320 uses homogeneous HDD ubers having HDD positions that store both data and parity such as in accordance with RAID6. Such use of a HDD tier 320 is well suited for storing data that is accessed less frequently than the data that resides in the hybrid tier 310.

When a host 22 writes data to the storage processing circuitry 40 of the data storage equipment 24 (also see FIG. 1), the storage processing circuitry 40 caches the data in a cache 330. In accordance with certain embodiments, the cache 330 provides persistence and fault tolerance enabling the storage processing circuitry 40 to acknowledge completion of the write operation even though the data may not have been synchronized to secondary storage.

At some point, the storage processing circuitry 40 performs a write operation that synchronizes the data to secondary storage. In accordance with certain embodiments, the storage processing circuitry 40 flushes the data from the cache 330 to the hybrid tier 310. Such flushing may involve selecting dirty pages, classifying the pages for possible deduplication, performing other operations (e.g., compression, etc.), writing the data to the hybrid tier 310, and updating various mappings.

It should be understood that overall such a flush cycle takes 100 ms or more. Since writing the parity for the data to the HDD storage 212 may take around 5 ms or less, the overall impact is 5% or less (e.g., generally 3 to 4%).

Once the data is in the hybrid tier 310, the data may be updated by a host 22. In such a situation, since the hybrid tier 310 stores the data in a circular log, the earlier version of the data is invalidated, and the new version of the data is written to the front of the log. Such handling of the data may continue in this manner each time the host updates the data.

In the background, the storage processing circuitry 40 performs garbage collection to reclaim log storage for future use. To this end, a garbage collection service consolidates valid data and into less space and writes that data either to the hybrid tier 310 or the HDD tier 320. In some arrangements, the garbage collection service demotes all data from the hybrid tier 310 to the HDD tier 320 during such garbage collection. In other arrangements, the garbage collection service demotes data from the hybrid tier 310 to the HDD tier 320 based on policy (e.g., evicting the less frequently accessed or "colder" data to the HDD tier 320 but keeping the more frequently accessed or "hotter" data in the hybrid tier 310).

When a host 22 reads data, the storage processing circuitry 40 finds where the data is located. In particular, if the data is already in the cache 330 (a cache hit), the storage processing circuitry 40 provides the data from the cache 330. However, if the data is not in the cache 330 (a cache miss), the storage processing circuitry 40 retrieves the data from secondary storage.

In particular, if the data is in the hybrid tier 310, the storage processing circuitry 40 reads the data from the hybrid tier 310 and provides the data to the host 22. Since the SSD storage 210 stores the data, reading the data is extremely fast (i.e., at SSD speed).

However, if the data is in the HDD tier 320, the storage processing circuitry 40 reads the data from the HDD tier 320 and provides the data to the host 22. Since the HDD storage 212 stores the data, reading the data is at HDD speed.

It should be appreciated that, since 100% of the SSD storage 210 may now be used for data, the SSD storage 210 holds more data that it otherwise would if the SSD storage 210 was also tasked with storing parity (i.e., a 50% drop in efficiency if using RAID5(2+1)). Accordingly, there is greater likelihood that the data will not have been evicted to the HDD tier 320 and will still be in the hybrid tier 310 thus providing faster response time. Further details will now be provided with reference to FIG. 5.

Figure 5:
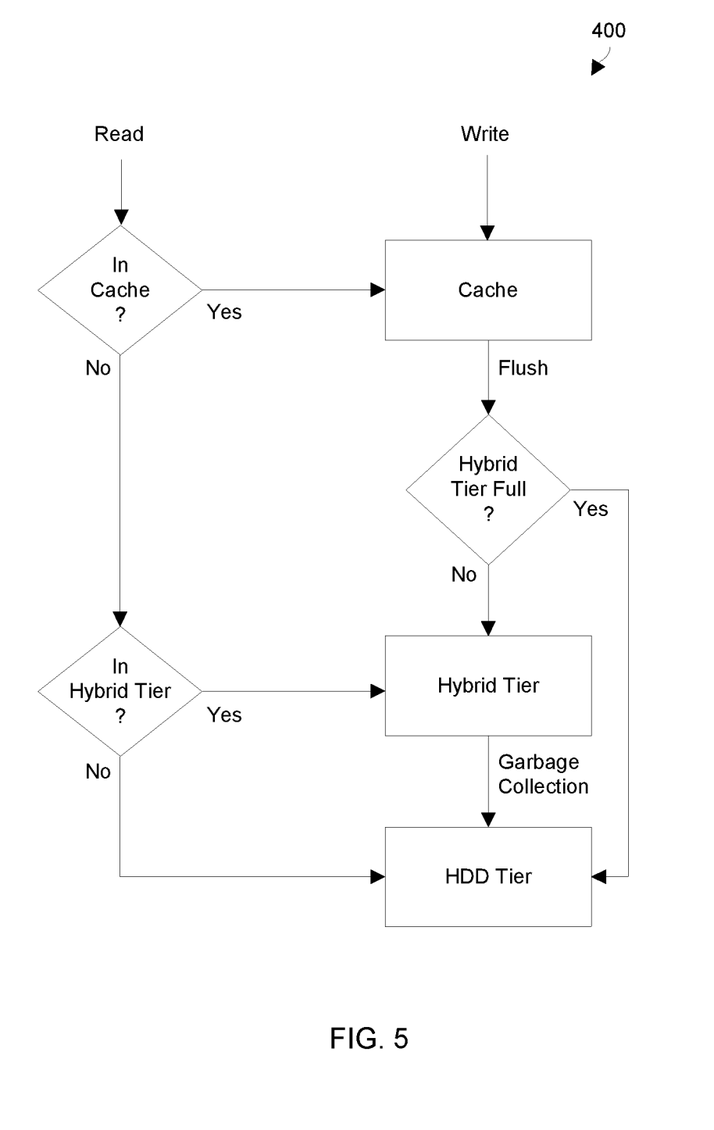
FIG. 5 is a flow diagram for various operations that access tiered storage having a hybrid tier.

FIG. 5 is a flow diagram 400 showing various operations that may be performed by the storage processing circuitry 40 (FIG. 1) using the tiered storage configuration 300 (FIG. 4). It should be understood that the flow diagram 400 may be expanded if there are additional storage tiers in use.

For a write operation, the storage processing circuitry 40 initially places the data in the cache. An NVRAM device is suitable for use as the cache.

Next, the storage processing circuitry 40 flushes (or de-stages) the data from the cache to the hybrid tier if there is available capacity. Such flushing of "dirty" data may occur in response to the cache becoming too full, periodically, etc.

When the storage processing circuitry 40 writes data to the hybrid tier, SSD positions store data and HDD positions store parity (e.g., in accordance with RAID5(2+1)). In accordance with certain embodiments, data is written at PLB (or RAID slice) granularity.

If there is not capacity available in the hybrid tier, the storage processing circuitry 40 flushes the data from the cache to the HDD tier. When the storage processing circuitry 40 writes data to the HDD tier, HDD positions store both data and parity (e.g., in accordance with RAID6).

Later, in accordance with certain embodiments, the background garbage collection service reclaims inefficiently utilized space within the circular log of the hybrid tier. To this end, the garbage collection service consolidates and moves valid data from the hybrid tier to the HDD tier. As a result, such garbage collection reclaims storage in the hybrid tier for future use.

For a read operation, the storage processing circuitry 40 determines where the data currently resides and loads the data from the proper location. In particular, if the data is already in the cache (i.e., a cache hit), the storage processing circuitry 40 provides the data from the cache. However, if the data is not in the cache (i.e., a cache miss), the storage processing circuitry 40 provides the data from either the hybrid tier or the HDD tier. Further details will now be provided with reference to FIG. 6.

Figure 6:
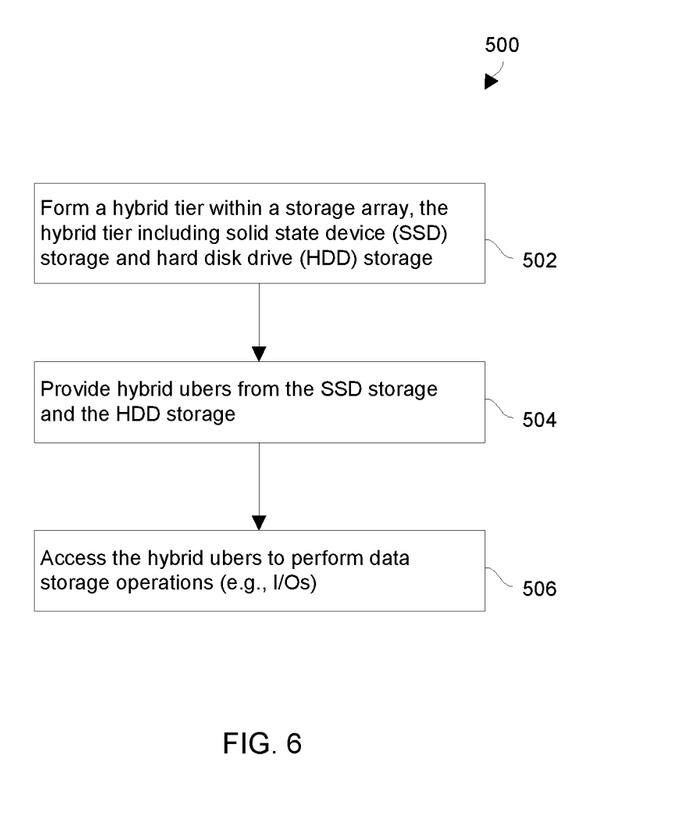
FIG. 6 is a flowchart of a procedure which is performed by a data storage environment in accordance with certain embodiments.

FIG. 6 is a flowchart of a procedure 500 which is performed by a data storage environment when managing data within a storage array in accordance with certain embodiments. Such a procedure 500 is well suited for optimizing SSD storage for data.

At 502, storage processing circuitry forms a hybrid tier within the storage array. The hybrid tier is configured to use solid state device (SSD) storage and hard disk drive (HDD) storage. The storage processing circuitry may provide other storage tiers as well such as a HDD tier.

At 504, the storage processing circuitry provides hybrid ubers from the SSD storage and the HDD storage of the hybrid tier. In particular, the storage processing circuitry may apply mapped-RAID techniques to provide hybrid log-structured storage implementing RAID5 where the SSD positions are configured to store data and the HDD positions are configured to store parity. In a particular embodiment, the storage processing circuitry forms a hybrid uber in accordance with RAID5(2+1) having two SSD positions for data and one HDD position for parity.

At 506, the storage processing circuitry accesses the hybrid ubers to perform data storage operations. Along these lines, write operations involve writing data to SSD positions and parity to HDD positions in log-structured storage. Read operations involve reading from SSD positions.

As described above, improved techniques utilize a hybrid tier which mixes SSD storage 210 and HDD storage 212. For example, in the context of a storage array 200 in which the number of SSD storage devices is limited, data may be stored only on the SSD storage 210 and parity may be stored only on the HDD storage 212. Accordingly, the SSD storage 210 no longer bears the cost for RAID protection but nevertheless provides certain speed advantages such as very fast read speeds (e.g., data may be read simply from SSD storage). Additionally, in the context of log-structured storage, use of such a hybrid tier still provides good write speeds (e.g., where the performance impact of writing parity to HDD storage of the hybrid tier is approximately 3% when flushing data from cache).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, RAID5(2+1) was described above as being a suitable RAID protection scheme for data stored within hybrid ubers. Other RAID protection schemes are suitable for use as well and may depend on the number of SSD devices available (i.e., each physical storage device 42 provides at most one storage position) such as RAID5(3+1), RAID5(4+1), combinations thereof, and so on.

Furthermore, in accordance with certain embodiments, space from the SSD storage 210 may be allocated for hot spare purposes. That is, in the event of an SSD failure, lost information can be reconstructed on the hot spare SSD storage space that has been set aside.

Similarly, in accordance with certain embodiments, space from the HDD storage 212 may be allocated for hot spare purposes. That is, in the event of an HDD failure, lost information can be reconstructed on the hot spare HDD storage space that has been set aside.

Additionally, it should be understood that an "uber" may also be referred to by other different terms such as a RAID extent or a RAID stripe. Similarly, a "disk slice" may also be referred to by other different terms such as a disk extent. Likewise, a "PLB" (i.e., a physical large block that may be considered the smallest allocation unit) may also be referred to by other different terms such as a RAID slice. Other terminology that is used within this document may be referred to using other different terms as well.

Furthermore, it should be understood that conventional storage system approaches use homogeneous RAID groups. Depending on the number of drives in the system and RAID configuration, parity overhead varies.

Also, for over-write systems, it is required to have a homogeneous RAID group (parity on similar high-cost media) because of read-modify-write algorithms which generate random read and random write on the parity position.

However, in instances, the number of SSD drives may be critical to overall performance. But some small configurations may only have a limited number of SSDs configured such as three SSDs. If RAID5(2+1) is applied to a homogeneous SSD storage tier, the RAID redundancy overhead will be 33.3%. Accordingly, such a system would not take good advantage of this part of capacity to boost the performance.

Advantageously, in accordance with certain embodiments disclosed herein, data storage equipment is capable of efficiently utilizing a minimal configuration such as a configuration that has only three SSDs in the system. For such a system, read I/O latency may be more important with less sensitivity placed on write I/O latency. Accordingly, certain embodiments provide for a heterogeneous media uber solution which could increase the overall SSD effective data capacity (or efficiency), as well as the end-to-end system performance, but without compromising the protection level.

In such a mixed media storage array with a mix of drives such as SSD and HDD, competitive position (e.g. performance, economics, etc.) of the array is determined by how efficiently higher cost media is utilized. One cause of inefficiency in usage of higher cost media which adds significant cost overhead is RAID protection which is ultimately necessary to provide data redundancy. This cost overhead may become significant when only few drives of higher cost media is added to the array which may be a normal use case.

In some embodiments, a hybrid storage array includes three SSD drives and six HDD drives. In such a storage array, to protect data on SSD, one option would be to create 1+1 mirror RAID group and reserve the third SSD as spare. However, this option would cause a raid protection overhead of 100%. Even with more SSD drives added to the array, overhead is significant: 50% in 2+1 R5 config and 25% in 4+1 R5 config. In contrast, use of hybrid ubers (data stored on SSD positions and parity stored on HDD positions) enables 100% of the SSD storage to be used for data (e.g., see FIG. 3).

In a multi-tiered configuration, an L1 user data tier is on SSD and an L2 user data tier will be on HDD (e.g., see FIG. 4).

For any write I/O, the write I/O lands at cache (e.g., a NVRAM device) first. Then, a mapper flush process destages data from the cache to the L1 tier if L1 still has available capacity. In the background, mapper GC process will move data from the L1 tier to the L2 tier.

For cache read miss TO, the mapper figures out where the data sits and load the data from the proper tier.

Apparently, if it is possible to increase the L1 user data tier size, the system may aggregate more user data. So, the probability of L1 read hit will increase, which ends up with better read performance. Additionally, while de-staging data from the L1 tier to the L2 tier, the more data that is aggregated in the L1 tier, the more flexibility garbage collection has, meaning that garbage collection works more efficiently.

In order to increase the SSD data efficiency of L1 tier, the L1 tier ubers mix SSD and HDD. In particular, the system saves user data on SSD and parity data on HDD.

With such a heterogeneous media uber, write performance may be bounded by the low performance media type (by HDD in above case), since updates are performed on both low performance media and high performance media. However, read performance is bounded by high performance media type (by SSD in above case) since all data is on SSD.

It should further be appreciated that, in certain systems, each mapper flush cycle has to go through certain steps:
1. Select at least 1K dirty pages from the NVRAM device
2. Classify the pages into two categories. One category for duplicable pages and one category for unique pages.
3. For the pages in the duplicable category, duplicate them to the targets.
4. For the pages in the unique category, compress those pages into a 2 MB PLB.
5. Persist the PLB to L1 or L2 user data tier.
6. Update the mapping, TOP/MID/LEAF.

Each flush cycle may usually take at least 100 ms to complete such steps. However, the action in step #5 only contributes 1.5 ms if the PLB is on SSD or 5 ms if the PLB is on HDD. The difference in terms of flush performance impact is only ~3%.

From the mapper flushing perspective, the performance penalty is only ~3%. However, if there is an increase the L1 cache size, the overall system level performance could benefit.

In some arrangements, SSDs and HDDs have separate spare reservations. Once a HDD or a SSD fails, the system uses the respective spare reservation to replace the broken drive slice and complete the rebuild.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing data within a storage array, the method comprising:
    forming a hybrid tier within the storage array, the hybrid tier including solid state device (SSD) storage and hard disk drive (HDD) storage;
    after the hybrid tier is formed, providing hybrid ubers from the SSD storage and the HDD storage of the hybrid tier; and
    after the hybrid ubers are provided, accessing the hybrid ubers to perform data storage operations;
    wherein forming the hybrid tier includes:
        identifying SSD storage positions from a set of SSDs and identifying HDD storage positions from a set of HDDs to provide the SSD storage and the HDD storage in accordance with a mapped-RAID (Redundant Array of Independent Disks) architecture;
    wherein providing the hybrid ubers includes:
        to form a hybrid uber, mapping at least one SSD storage position identified from the set of SSDs and at least one HDD storage position identified from the set of HDDs; and
    wherein mapping to form the hybrid uber includes:
        configuring each of the at least one SSD storage position to store only data, and
        configuring each of the at least one HDD storage position to store only parity.

2. A method as in claim 1 wherein providing the hybrid ubers further includes:
    after the hybrid uber is formed, incorporating the hybrid uber into a hybrid circular storage log.

3. A method as in claim 2 wherein mapping to form the hybrid uber further includes:
    combining multiple SSD storage positions and one HDD storage position into a RAID5 layout.

4. A method as in claim 2 wherein mapping to form the hybrid uber further includes:
    combining exactly two SSD storage positions and exactly one HDD storage position into a RAID5(2+1) layout in which data is stored in each SSD storage position and parity is stored in the exactly one HDD storage position.

5. A method as in claim 2, further comprising:
    forming a HDD tier within the storage array, the HDD tier including additional HDD storage provided by additional HDD storage positions identified from the set of HDDs;
    after the HDD tier is formed, providing HDD ubers from the additional HDD storage of the HDD tier; and
    after the HDD ubers are provided, accessing the HDD ubers to perform data storage operations.

6. A method as in claim 5 wherein mapping to form the hybrid uber further includes:
    combining multiple SSD storage positions and one HDD storage position into a RAID5 layout; and
    wherein providing the HDD ubers from the additional HDD storage of the HDD tier includes:
        forming a HDD uber from at least some of the additional HDD storage positions, the HDD uber having a RAID6 layout.

7. A method as in claim 5, further comprising:
    providing a garbage collection service that garbage consolidates valid data from the hybrid tier to the HDD tier to reclaim storage in the hybrid circular storage log.

8. A method of claim 1, wherein accessing the hybrid ubers to perform data storage operations includes:
    receiving a request to store dirty data from a cache;
    determining whether the hybrid tier has available capacity to store the dirty data;
    in response to determining that the hybrid tier has available capacity to store the dirty data, flushing the dirty data to the hybrid tier;
    in response to determining that the hybrid tier does not have available capacity to store the dirty data, flushing the dirty data to a homogenous HDD tier in the storage array.

9. A method of claim 1, wherein accessing the hybrid ubers to perform data storage operations includes:
    identifying data stored in the hybrid tier that has not been accessed for a predetermined amount of time; and
    evicting the identified data from the hybrid tier to a homogenous HDD tier in the storage array, the homogenous HDD tier including additional HDD storage provided by additional HDD storage positions identified from the set of HDDs.

10. Data storage equipment, comprising:
    memory; and
    control circuitry coupled to the memory, the memory storing instructions which, when carried out by the control circuitry, cause the control circuitry to perform a method of:
        forming a hybrid tier within the storage array, the hybrid tier including solid state device (SSD) storage and hard disk drive (HDD) storage, after the hybrid tier is formed, providing hybrid ubers from the SSD storage and the HDD storage of the hybrid tier; and after the hybrid ubers are provided, accessing the hybrid ubers to perform data storage operations;

wherein forming the hybrid tier includes:
identifying SSD storage positions from a set of SSDs and identifying HDD storage positions from a set of HDDs to provide the SSD storage and the HDD storage in accordance with a mapped-RAID (Redundant Array of Independent Disks) architecture;

wherein providing the hybrid ubers includes:
to form a hybrid uber, mapping at least one SSD storage position identified from the set of SSDs and at least one HDD storage position identified from the set of HDDs; and wherein mapping to form the hybrid uber includes:
configuring each of the at least one SSD storage position to store only data, and
configuring each of the at least one HDD storage position to store only parity.

11. Data storage equipment as in claim 10 wherein providing the hybrid ubers further includes:
after the hybrid uber is formed, incorporating the hybrid uber into log-structured storage.

12. Data storage equipment as in claim 11 wherein mapping to form the hybrid uber further includes:
combining multiple SSD storage positions and one HDD storage position into a RAID5 layout.

13. Data storage equipment as in claim 11 wherein mapping to form the hybrid uber further includes:
combining exactly two SSD storage positions and exactly one HDD storage position into a RAID5(2+1) layout in which data is stored in each SSD storage position and parity is stored in the exactly one HDD storage position.

14. Data storage equipment as in claim 11, further comprising:
forming a HDD tier within the storage array, the HDD tier including additional HDD storage provided by additional HDD storage positions identified from the set of HDDs;
after the HDD tier is formed, providing HDD ubers from the additional HDD storage of the HDD tier; and
after the HDD ubers are provided, accessing the HDD ubers to perform data storage operations.

15. Data storage equipment as in claim 14 wherein mapping to form the hybrid uber further includes:
combining multiple SSD storage positions and one HDD storage position into a RAID5 layout; and
wherein providing the HDD ubers from the additional HDD storage of the HDD tier includes:
forming a HDD uber from at least some of the additional HDD storage positions, the HDD uber having a RAID6 layout.

16. Data storage equipment as in claim 14, further comprising:
providing a garbage collection service that garbage consolidates valid data from the hybrid tier to the HDD tier to reclaim storage capacity in the log-structured storage.

17. Data storage equipment as in claim 10 wherein accessing the hybrid ubers to perform data storage operations includes:
receiving a request to store dirty data from a cache;
determining whether the hybrid tier has available capacity to store the dirty data;
in response to determining that the hybrid tier has available capacity to store the dirty data, flushing the dirty data to the hybrid tier;
in response to determining that the hybrid tier does not have available capacity to store the dirty data, flushing the dirty data to a homogenous HDD tier in the storage array.

18. Data storage equipment as in claim 10 wherein accessing the hybrid ubers to perform data storage operations includes:
identifying data stored in the hybrid tier that has not been accessed for a predetermined amount of time; and
evicting the identified data from the hybrid tier to a homogenous HDD tier in the storage array, the homogenous HDD tier including additional HDD storage provided by additional HDD storage positions identified from the set of HDDs.

19. A computer program product having a non-transitory computer readable medium which stores a set of instructions to manage data within a storage array; the set of instructions, when carried out by computerized circuitry, causing the computerized circuitry to perform a method of:
forming a hybrid tier within the storage array, the hybrid tier including solid state device (SSD) storage and hard disk drive (HDD) storage;
after the hybrid tier is formed, providing hybrid ubers from the SSD storage and the HDD storage of the hybrid tier; and
after the hybrid ubers are provided, accessing the hybrid ubers to perform data storage operations;

wherein forming the hybrid tier includes:
identifying SSD storage positions from a set of SSDs and identifying HDD storage positions from a set of HDDs to provide the SSD storage and the HDD storage in accordance with a mapped-RAID (Redundant Array of Independent Disks) architecture;

wherein providing the hybrid ubers includes:
to form a hybrid uber, mapping at least one SSD storage position identified from the set of SSDs and at least one HDD storage position identified from the set of HDDs; and wherein mapping to form the hybrid uber includes:
configuring each of the at least one SSD storage position to store only data, and
configuring each of the at least one HDD storage position to store only parity.

20. A computer program product as in claim 19 wherein accessing the hybrid ubers to perform data storage operations includes:
receiving a request to store dirty data from a cache;
determining whether the hybrid tier has available capacity to store the dirty data;
in response to determining that the hybrid tier has available capacity to store the dirty data, flushing the dirty data to the hybrid tier;
in response to determining that the hybrid tier does not have available capacity to store the dirty data, flushing the dirty data to a homogenous HDD tier in the storage array.

21. A computer program product as in claim 19 wherein accessing the hybrid ubers to perform data storage operations includes:
identifying data stored in the hybrid tier that has not been accessed for a predetermined amount of time; and
evicting the identified data from the hybrid tier to a homogenous HDD tier in the storage array, the homogenous HDD tier including additional HDD storage provided by additional HDD storage positions identified from the set of HDDs.

\* \* \* \* \*